UNITED STATES PATENT OFFICE.

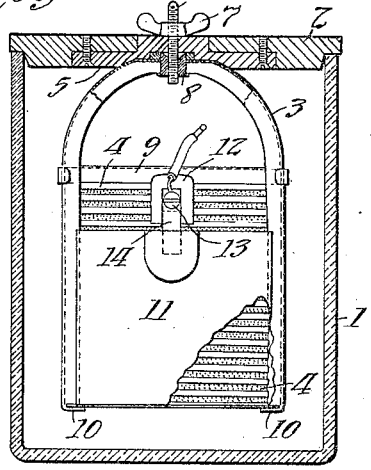
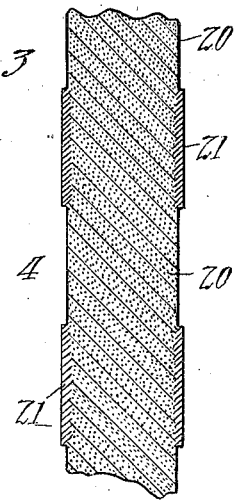
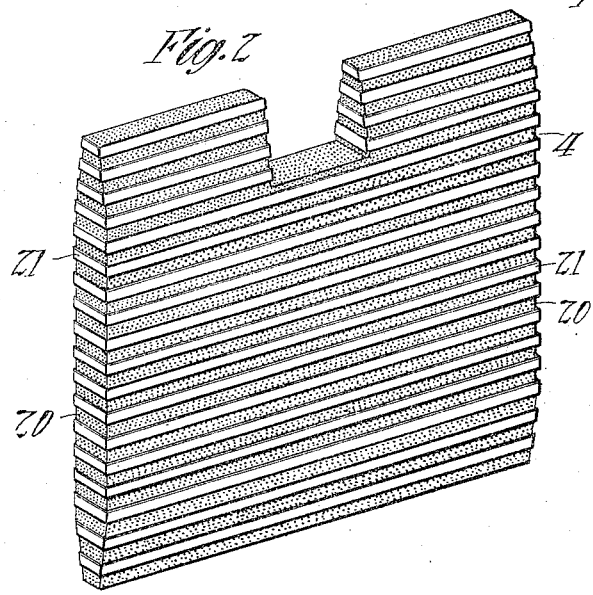
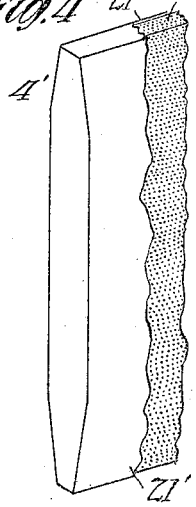

EDWARD McGALL, OF ORANGE, NEW JERSEY, ASSIGNOR TO NEW JERSEY PATENT COMPANY, OF WEST ORANGE, NEW JERSEY, A CORPORATION OF NEW JERSEY.

PRIMARY BATTERY.

1,201,480.   Specification of Letters Patent.   Patented Oct. 17, 1916.

Application filed September 14, 1915. Serial No. 50,625.

*To all whom it may concern:*

Be it known that I, EDWARD McGALL, a citizen of the United States, and a resident of Orange, in the county of Essex and State of New Jersey, have invented certain new and useful Improvements in Primary Batteries, of which the following is a description.

My invention relates to primary batteries and particularly, but not exclusively, to that class of batteries in which the negative electrode consists of a plate or plates of oxid of copper or other depolarizing agent properly molded or agglomerated, and the positive electrode consists of a plate or plates of zinc. By the term "positive electrode" as used herein, I mean the electrode from which current flows through the electrolyte to the other or negative electrode.
The negative electrode plates of batteries of this type are commonly made of agglomerated masses of oxid of copper formed under great pressure and baked at high temperature. As oxid of copper is, in itself, a very poor conductor, it has been customary to provide such electrode plates with a thin coating or film of copper in order to insure proper conductivity between the plates and their supporting frames and to render the plates themselves of sufficient conductivity to enable a battery provided with one or more of such plates to supply current substantially of the strength which the battery is designed to generate, to the battery circuit immediately upon closing the latter.

Heretofore the copper oxid plates have been provided with such coating of copper by immersing the plates in an electrolytic bath and reducing the surface portions thereof electrolytically. The forming of the copper coating on a plate in this manner is, however, objectionable as part of the plate itself is employed in producing the conductive surface or coating. Furthermore, the copper coating so formed is spongy and therefore absorbs considerable liquid from the electrolytic bath, and as copper readily oxidizes when wet, considerable oxidation of such coating occurs when the plate is removed from the electrolytic bath and dried. Consequently, the conductivity of the coating is greatly reduced, and when the battery circuit of a battery equipped with a plate provided with such a coating is closed, a considerable amount of current is used in reducing the surface of the plate, and some time elapses before the battery supplies the circuit with the full strength of current which it is designed to generate.

The principal object of my invention is to provide an improved negative electrode plate for primary batteries, and especially a plate of this character composed of oxid of copper having a substantially homogeneous coating of conductive metal wherein the above objections will be largely obviated.

My invention also contemplates a novel method whereby a plate of this character may be economically and readily provided with such a coating.

More particularly described, a negative electrode made in accordance with my invention consists of a plate comprising a molded or agglomerated mass of oxid of copper and having on its exterior a thin slightly porous but substantially homogeneous film or coating of a single substantially pure conductive metal, preferably copper. The plate may either be entirely covered with such coating of conductive metal or provided with spaced surface portions thereof, as by applying thin separated bands or strips of such metal thereto. This film or coating preferably comprises finely divided and very compact metallic particles which are adjacent to and overlap one another and are mechanically united to each other and to the plate, preferably by impact in the application thereof to the plate, to form an integral part of the latter and a slightly porous substantially homogeneous surface layer therefor. In producing such a conductive coating on an oxid of copper plate, I preferably atomize a molten mass of the metal it is desired to employ in coating the plate so as to produce a fine spray consisting of very finely divided and compact particles of the metal, and project such spray against the plate with great force. The metallic spray is projected against the plate with sufficient force to cause the compact particles of metal constituting the spray to penetrate the pores in the surface of the oxid of copper plate and to become firmly united with the plate. The finely divided particles are more or less flattened under the impact thereof in striking the plate and as they are projected against the plate closely adjacent each other, overlap and become firmly united to form a substantially homogeneous surface layer. The plate may be entirely covered with a conductive metallic layer in this manner in a very short time. When it is desired to provide spaced surface portions only of the electrode plate with the conductive metal, a suitable stencil plate is employed in conjunction with the electrode plate so as to expose to the projected metallic spray only those portions of the electrode plate which it is desired to coat. In this method of coating a battery plate with a film of conductive metal, such as copper, no water or the like is employed, and consequently the liability of the copper coating becoming oxidized is reduced to a minimum, whereas when the conductive coating is produced by reducing the surface of an oxid of copper plate by electrolysis, which is a wet process, it is practically impossible to prevent a considerable oxidation of such coating.

In order that my invention may be more clearly understood, attention is directed to the drawing accompanying and forming part of this specification, and in which:

Figure 1 is a vertical sectional view, partly in elevation and partly broken away, of a primary battery provided with a negative electrode plate embodying my invention; Fig. 2 is an enlarged view in perspective of the negative electrode plate of the battery shown in Fig. 1; Fig. 3 is an enlarged fragmental transverse sectional view of the plate shown in Fig. 2; and Fig. 4 is a fragmental view, similar to Fig. 2, showing a modified form of a negative electrode plate in accordance with my invention.

In Fig. 1 of the drawing is shown a primary battery substantially of the construction disclosed in Patent No. 1,090,909, granted March 24, 1914 to E. G. Dodge. Referring to Fig. 1, reference character 1 indicates an ordinary containing jar of glass or other suitable material, provided with a cover 2 of insulating material, such as porcelain. Reference character 3 represents a frame or hanger preferably constructed of a strip of sheet copper or copper plated with iron, the edges of said strip being turned up to such an extent as to lie flat against the bevel edges of the negative electrode plate 4. The hanger 3 is in the form of an inverted U, the two arms of which hold the edges of the plate 4, and the hanger is supported from the cover 2 in any convenient manner, as by means of the plate 5 which is countersunk in the cover 2. A screw 6 and a butterfly nut 7 serve to support the hanger from the plate 5, the hanger being provided with a suitable bearing 8 for the screw 6. The cross bar 9, secured at its ends to the arms of the hanger, bears on the top of the negative plate 4. The lower end portions of the arms of the hanger 3 are bent inwardly, as shown at 10, to form a bottom support for the plate 4. Reference character 11 represents one of the two positive plates, the other positive plate not being shown, which are disposed on opposite sides of the negative plate in spaced relation thereto. A block 12 of suitable insulating material, is secured in recesses provided therefor in the upper end portion of the negative plate 4 and in the cross bar 9, and each of the positive plates is supported from the block 12 by means of a bolt 13 extending through said block and a suitable connection 14 mounted at one end on the bolt 13 and secured at its other end to the plate.

The negative electrode 4, as shown in Figs. 1 to 3, consists of a plate composed of a mass 20 of molded or agglomerated oxid of copper and having thin spaced surface portions 21 in the form of bands or strips of metal, preferably formed of substantially pure copper and preferably disposed in spaced parallel relation, applied to the exterior thereof in the manner above described. The bands or strips 21 extend entirely around the plate and are approximately .005 of an inch in thickness, the thickness thereof as shown in Figs. 2 and 3 being greatly exaggerated for the purposes of illustration. As shown in Fig. 3, the metal of which bands 21 are composed, due to its application to the plate in the manner hereinbefore described, penetrates the pores of the agglomerated mass of oxid of copper, whereby the bands are firmly united to the plate and become substantially an integral part thereof.

Fig. 4 illustrates a modified negative electrode plate 4' in accordance with my invention, which plate consists of a mass 20' of molded or agglomerated oxid of copper entirely covered with a thin coating or film 21 of conductive metal, preferably copper, applied thereto in the manner hereinbefore described.

Having now described my invention, what I claim as new and desire to protect by Letters Patent is as follows:

1. A voltaic battery element having a metallic coating, said coating comprising finely divided compact metallic particles adjacent to and overlapping one another and forming a substantially homogeneous surface layer, substantially as described.

2. An electrode element for voltaic batteries having a metallic coating, said coating comprising finely divided metallic particles applied to the element adjacent to each other, said particles being more or less flattened and overlapping and adhering to one another, forming a substantially homogeneous surface layer, substantially as described.

3. An oxid of copper element for voltaic batteries having a plurality of spaced metallic surface portions, each of said surface portions comprising finely divided compact metallic particles adjacent to and overlapping one another, forming a substantially homogeneous layer, substantially as described.

4. An electrode element for voltaic batteries having a plurality of spaced thin metallic bands or strips on the exterior thereof, each of said bands or strips comprising finely divided compact metallic particles united by impact to each other and to said element to form an integral part thereof, substantially as described.

5. An electrode element for voltaic batteries having a plurality of spaced metallic surface portions, each of said surface portions comprising finely divided metallic particles applied to the element adjacent to each other, said particles being more or less flattened and overlapping and adhering to each other, forming a substantially homogeneous layer, substantially as described.

This specification signed and witnessed this 13th day of Sept. 1915.

EDWARD McGALL.

Witnesses:
G. A. WALSH,
WILLIAM A. HARDY.